United States Patent
Niebling et al.

(10) Patent No.: US 8,956,054 B2
(45) Date of Patent: Feb. 17, 2015

(54) INNER RACEWAY WITH AXIAL EXTENSION

(71) Applicant: Schaeffler Technologies AG & Co. KG, Herzogenaurach (DE)

(72) Inventors: Peter Niebling, Bad Kissingen (DE); Roland Langer, Schwanfeld (DE)

(73) Assignee: Schaeffler Technologies AG & Co. KG, Industriestrasse (DE)

( * ) Notice: Subject to any disclaimer, the term of this patent is extended or adjusted under 35 U.S.C. 154(b) by 0 days.

(21) Appl. No.: 13/868,589

(22) Filed: Apr. 23, 2013

(65) Prior Publication Data

US 2013/0283954 A1 Oct. 31, 2013

(30) Foreign Application Priority Data

Apr. 27, 2012 (DE) .................... 10 2012 207 054

(51) Int. Cl.
| F16C 13/00 | (2006.01) |
| F16C 33/58 | (2006.01) |
| F16C 33/78 | (2006.01) |
| F16C 33/60 | (2006.01) |
| B60B 27/00 | (2006.01) |
| F16C 33/76 | (2006.01) |
| F16C 19/18 | (2006.01) |

(52) U.S. Cl.
CPC ........... *F16C 33/585* (2013.01); *F16C 33/7826* (2013.01); *F16C 33/586* (2013.01); *F16C 33/60* (2013.01); *B60B 27/001* (2013.01); *B60B 27/0073* (2013.01); *B60B 27/0084* (2013.01); *F16C 33/768* (2013.01); *F16C 2226/52* (2013.01); *F16C 19/186* (2013.01); *F16C 2326/02* (2013.01); *B60B 27/0015* (2013.01)
USPC .......................................... 384/564; 384/544

(58) Field of Classification Search
CPC .............. F16C 33/723; B60B 27/0073; B60B 27/0084
USPC ............... 29/898.07; 384/489, 513, 537, 544, 384/560, 564, 585, 589
See application file for complete search history.

(56) References Cited

U.S. PATENT DOCUMENTS

| 4,893,960 A | * | 1/1990 | Beier et al. ...................... 403/24 |
| 5,822,859 A | | 10/1998 | Kessen et al. |
| 6,634,951 B2 | * | 10/2003 | Sahashi et al. ................ 464/145 |

(Continued)

FOREIGN PATENT DOCUMENTS

| DE | 3418440 | 11/1985 |
| DE | 102009059844 | 8/2010 |
| JP | 2001001710 | 1/2001 |
| JP | 2005106215 | 4/2005 |
| JP | 2007198575 | 8/2007 |

(Continued)

*Primary Examiner* — Phillip A Johnson
(74) *Attorney, Agent, or Firm* — Simpson & Simpson, PLLC

(57) ABSTRACT

An inner raceway (3) having a rolling element raceway facing radially outward, for an angular contact bearing arrangement, and particularly an angular ball bearing arrangement, where a cylindrical surface which is situated at the furthest outward position radially is included as a seal seat. Such inner raceways are used in wheel bearing units, for example, which have an orbital rivet bond, which in turn can also form an end-face gearing (7). The orbital rivet bond and the axial extension (8) of the inner raceway form an annular gap (20) which leads to a configuration where a decoupling of loads from the inner raceway (3) prevents an undesired deformation of the same. In addition, advantages result from the sealing of the region of the orbital rivet bond and/or the end-face gearing (7) thereof.

10 Claims, 2 Drawing Sheets

(56) References Cited

U.S. PATENT DOCUMENTS

| | | |
|---|---|---|
| 6,908,231 B2 * | 6/2005 | Hagiwara ..................... 384/537 |
| 8,313,244 B2 * | 11/2012 | Kamikawa et al. ........... 384/544 |
| 2002/0067875 A1 * | 6/2002 | Toda et al. ................... 384/544 |
| 2003/0002761 A1 | 1/2003 | Hagiwara |
| 2008/0240642 A1 | 10/2008 | Harada et al. |

FOREIGN PATENT DOCUMENTS

| | | |
|---|---|---|
| JP | 2008240957 | 10/2008 |
| WO | 2006111146 | 10/2006 |
| WO | 2006114083 | 11/2006 |
| WO | 2007119595 | 10/2007 |
| WO | 2012173133 | 12/2012 |

\* cited by examiner

INNER RACEWAY WITH AXIAL EXTENSION

CROSS-REFERENCE TO RELATED APPLICATIONS

This application claims priority from German Patent Application No. 10 2012 207054.0 filed Apr. 27, 2012, which application is incorporated herein by reference in its entirety.

FIELD OF THE INVENTION

The invention relates to an inner raceway having a rolling element raceway for an angular contact bearing arrangement, and particularly for an angular ball bearing arrangement, wherein said rolling element raceway is arranged on the peripheral outside of the inner raceway, and wherein a cylindrical surface positioned the farthest outside on the periphery is included as a seal seat. In addition, the invention relates to a wheel bearing unit having an inner raceway which is fastened and braced via an orbital rivet bond, wherein the orbital rivet bond abuts an axial end face of the inner raceway, and is enclosed radially by an axial extension constructed on the axial end face.

BACKGROUND OF THE INVENTION

Such an inner raceway having an axial extension is used in bearing arrangements which have an inner raceway which is joined to another component, such as a wheel hub, for example, by means of orbital riveting, or which is tensioned against said component. Most of the bearing arrangements which are designed as radial bearings have an axial surface on the axial side thereof which is oriented substantially perpendicular to the axis of rotation, which is why an orbital rivet bond typically rises above this outer surface and is therefore exposed to environmental conditions, such as water contamination or foreign particles, for example. These worsen the condition of the orbital rivet bond over the service lifetime of the bearing. This can be the result of water, for example, which commonly leads to the formation of rust, thereby compromising the tensioning of the inner raceway.

In addition, a similar problem exists for end-face-geared bearing units which transmit torque by means of axial gearing, and wherein the gear teeth which engage with each other are likewise exposed to undesired environmental influences.

Wheel bearings are known from WO2006/114083 which have an inner raceway with an axial recess, wherein the orbital rivet bond has been pressed and/or formed into said axial recess, and additionally forms an end-face gearing on the axial end face thereof. The orbital rivet bond is entirely enclosed peripherally by the inner raceway, and is protected by the same.

As an alternative, various methods of covering are known, such as in WO2006/111146, for example, wherein a ring-shaped, elastic cover element is used for the purpose of covering and sealing, around the periphery thereof, the gear teeth which engage with each other.

In the case of the variant which has the inner raceway which provides a peripheral enclosure, the problem was discovered that the inner raceway is subject to strong stresses as a result of the orbital riveting, and therefore the rolling element raceway assumes a shape due to the radial forming forces which is disadvantageous for the rolling motion.

BRIEF SUMMARY OF THE INVENTION

The problem addressed by the invention is that of demonstrating a lasting protection of the orbital rivet bond region without the need to accept associated disadvantageous side effects.

The invention is based on the realization that an inner raceway which peripherally encloses the orbital rivet bond, wherein radial forces were applied during the creation of the orbital rivet bond, can deviate in a disadvantageous manner from its original shape. This is particularly disadvantageous because it is necessary to manufacture inner raceways from so-called ball-bearing steel, which is a high-cost material. As such, an inner raceway which is thin and/or utilizes little material overall is advantageous for the final price of the product.

The invention is further based on the realization that it is not possible to achieve a secure hold, and an optimum hold of a protection element, for example, in the form of a cover element or protective plate, due to the deficiency in well-defined surfaces. As a result, it can be expected that the bearing will be dislocated and/or damaged.

The problem is addressed with an inner raceway, wherein an axial extension is constructed on the axial end face of the inner raceway situated opposite the rolling element raceway axially, wherein the axial extension has an internal diameter on the inner periphery thereof which grows larger as it approaches the outside. The configuration prevents the axial extension—which can have a ring shape, for example, from needing to accept any radial forces during and/or after the riveting of the inner raceway. As a result, the inner raceway must only accept forming or tensioning forces which are exerted in the axial dimension. As such, it is possible to rule out a deformation of the rolling element raceway of the inner raceway.

The axial extension is designed to be materially bonded to the inner raceway. As a result, it can be manufactured in a very simple manner, and can optionally provide a surface for the attachment of a protective plate or the like.

Advantageous inner surface shapes of the axial extension could form conical or parabolic inner surfaces, for example, each forming a segment of a cone and/or of a paraboloid. Other similar shapes can likewise be contemplated.

In one embodiment, the outer peripheral surface of the axial extension forms a second seat. The second seat can be utilized for the purpose of attaching a protective plate or the like, thereby making it possible to protect the annular gap, which in itself can form a space for the accumulation of water and particles of contamination. As such, the axial extension can both provide for the uncoupling of radial forces from the inner raceway, and can provide for the protection of the orbital rivet bond region from water and foreign particles.

The invention includes a wheel bearing unit, wherein an annular gap is designed between the orbital rivet bond and the axial extension concentrically. The shape of the inner surface of the axial extension need not necessarily be that of a cone or paraboloid. Rather, it can have a cylindrical shape, by way of example, as long as the orbital rivet bond forms an annular gap together with the inner surface of the axial extension. In one embodiment, an outside periphery of the orbital rivet bond forms an apex angle together with an inner periphery of the axial extension. The outer periphery of the orbital rivet bond should have the same outer radius which is smaller than or equal to the smallest outer radius of the rolling element raceway of the inner raceway. In this way, the configuration ensures that the axial forces which are transmitted by the orbital rivet bond to the inner raceway cannot lead to a disadvantageous deformation of the inner raceway, wherein the axial extension is even uncoupled from both axial and radial forces. In other words, it is possible to ensure that the axial extension transmits no forces, and only the inner peripheral part of the inner raceway, the same having been tensioned, conveys such forces to the bearing.

In one embodiment, the outer periphery of the orbital rivet bond and/or the inner periphery of the axial extension do not form a cylindrical surface, but rather a conical surface. Such surfaces are simple to manufacture, and simultaneously enable a good visual inspection for the purpose of examining the radial load on the axial extension.

A wheel bearing unit of the invention, and/or an inner raceway of the invention, are very well suited for the axial transmission of torque, wherein an end-face gearing is constructed on the orbital rivet bond for the purpose of transmitting torque. This spur gearing can likewise be peripherally enclosed by the axial extension, wherein it is actually possible to protect both gearings by means of the axial extension as a result of the axial engagement of the meshing gears.

As an alternative, it is possible for the axial extension to present only one outer peripheral surface which is suited for the attachment of a protective element, such as a protective plate or the like, for example, and which encloses the entire region of the gearings and/or of the orbital rivet bond, and which is statically sealed from the outer race. By way of example, a protective ring having an elastic part is suited for this purpose, wherein said elastic part is provided with the stability it requires by means of a reinforcement. The elastic part can form sealing lips which form a further static seal from the outer raceway and/or from the inner raceway, and/or form a seal of the inner raceway from the outer raceway.

A further advantage of the protective ring attached on the outer periphery of the axial extension is the simple installation thereof before the bearing, and the wheel bearing, is attached to an element which transmits torque, such as the outer race, for example. These torques are rotary torques which originate from the engine, wherein the drive torque thereof is directed to the outer race—optionally via a drive train.

The size of the annular gap and/or the air gap is preferably 0.05 to 8 mm, wherein the gap size is defined as the distance between the outer periphery of the orbital rivet bond and the inner periphery of the axial extension. As such, an adequate buffer is included which can receive excess material from the riveting and/or from the gear teeth stamping without transmitting radial forces to the axial extension.

The smallest inner raceway cross-section is larger than a third of the rolling element diameter, wherein the inner raceway cross-section in the region of the rolling element raceway is embedded with an end-face gearing for the orbital rivet bond. The inner raceway cross-section is defined as the radial difference of the radius of the base of the raceway (the smallest radius of the rolling element raceway of the inner raceway with respect to the axis of rotation of the angular ball bearing or the tapered bearing) and the radius of the seat of the inner raceway.

In one embodiment, the smallest inner raceway cross-section from the base of the rolling element raceway to the bore hole of the inner raceway is larger than a fifth of the diameter of the rolling body. This inner raceway cross-section of approximately a fifth of the rolling element diameter is desirable due to the smaller amount of material involved, and is only made possible for the first time by the configuration described herein which uncouples the axial extension and the inner raceway from radial forces.

The outer periphery of the axial extension extends over a length of at least 2 mm, whereby the outer peripheral surface is adequate to serve as a seat for a protective element, for example, an interface seal.

In one embodiment, the outer periphery which serves as a centering well is sunk lower than the first seal seat of the roller bearing seal on the inner raceway. In this way, the inner raceway presents an axial end face which can serve as an axial limit stop for the protective element, without involving the actual seal of the roller bearing. The seal can be an interface seal, for example, which is drawn over the axial extension.

BRIEF DESCRIPTION OF THE SEVERAL VIEWS OF THE DRAWING

The nature and mode of operation of the present invention will now be more fully described in the following detailed description of the invention taken with the accompanying drawing figures, in which.

DETAILED DESCRIPTION OF THE INVENTION

Figure 1:
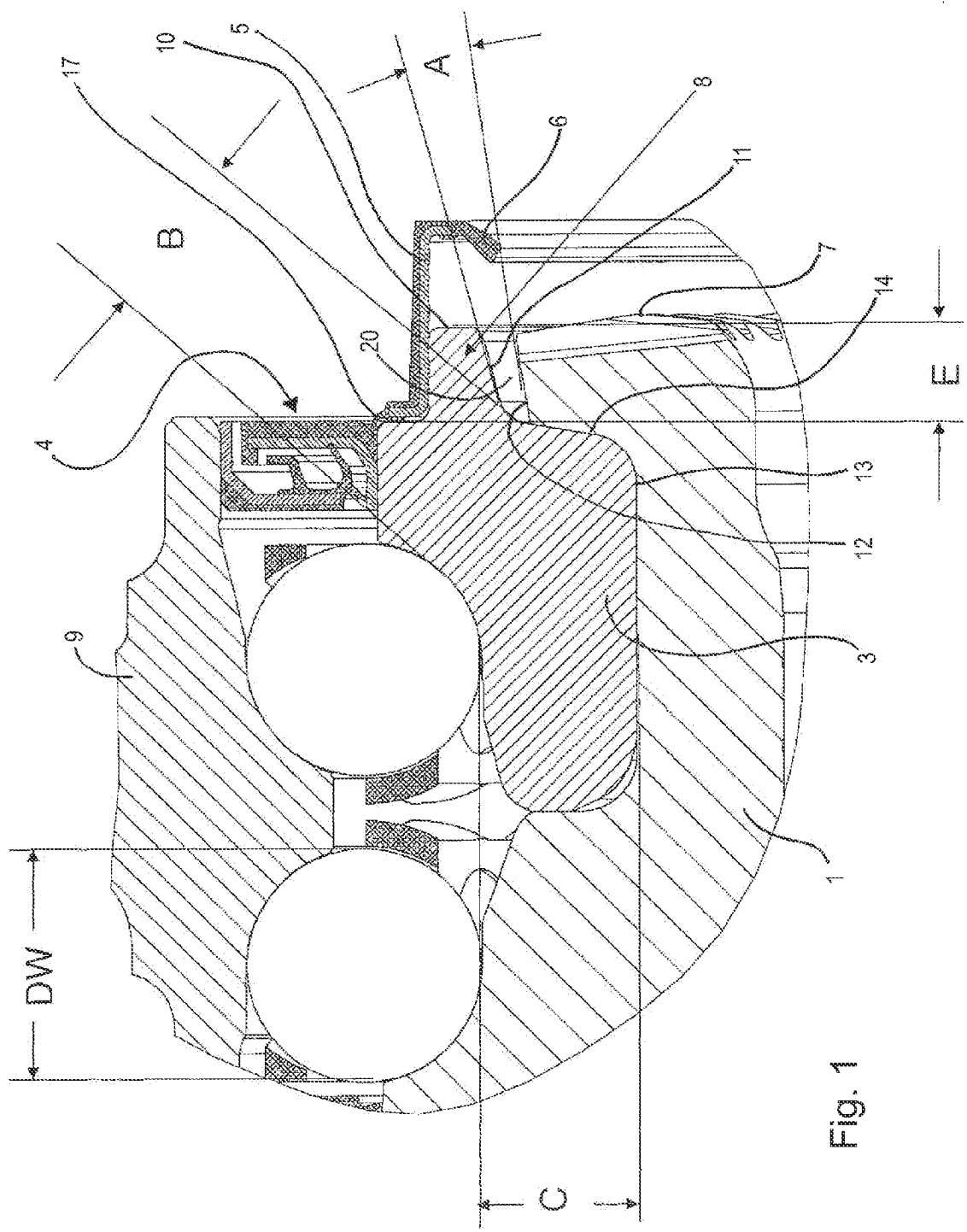
FIG. 1 is a partial longitudinal cross-section of a wheel bearing unit of the invention, designed as an angular contact ball bearing; and, FIG. 2 is a more detailed inner raceway.
Figure 2:
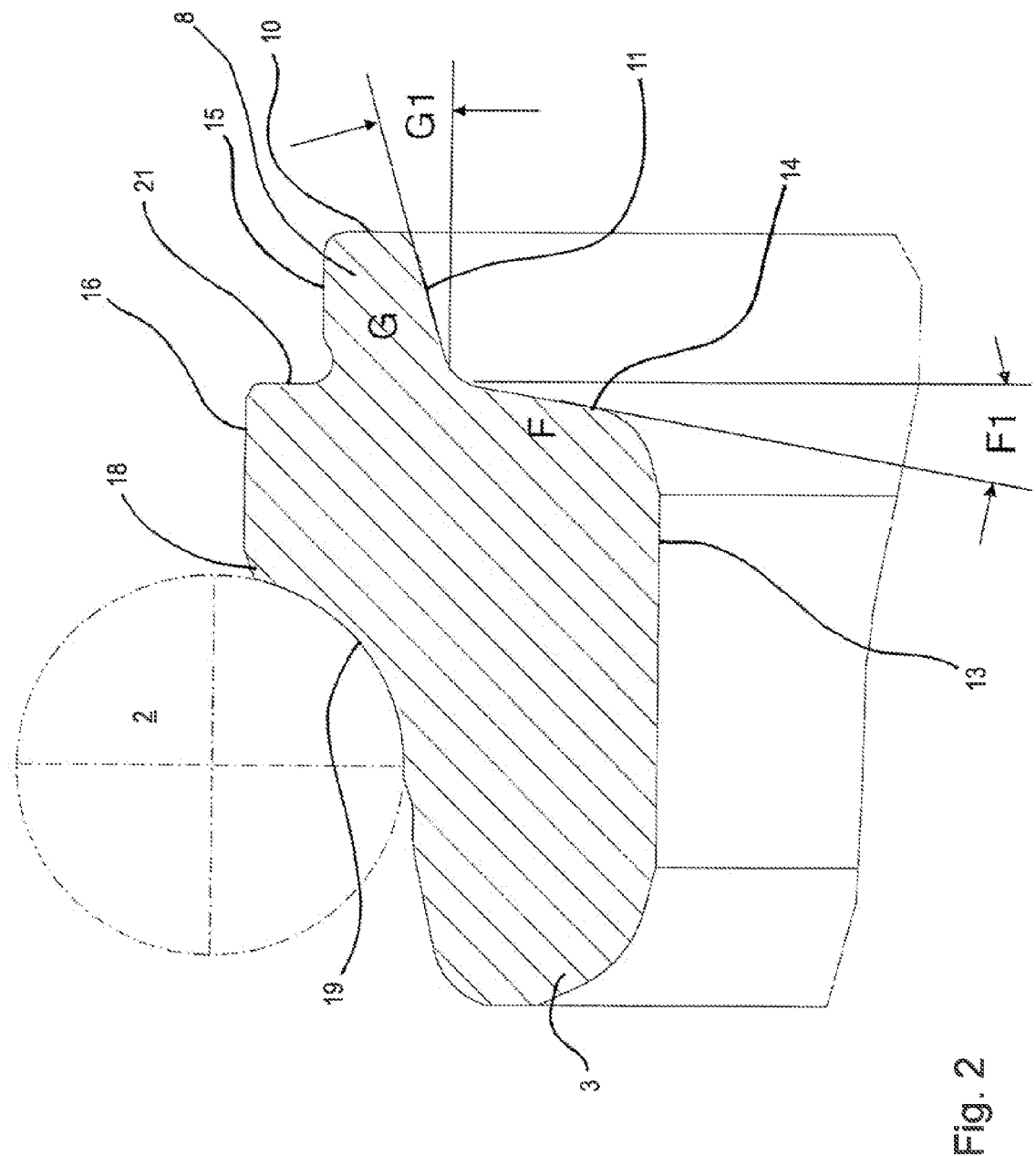

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

The bearing is a double row angular ball bearing which is designed as a wheel bearing. Both rows of the rolling elements 2 are tensioned against the wheel hub 1 via the outer ring 9 by means of a riveting of the inner raceway 3. The seal arrangement 4 is designed as a cassette seal which is pressed between the outer ring 9 and the inner raceway 3 as a unit.

The orbital rivet bond 7 has an end-face gearing constructed on the outer side thereof with respect to the axial dimension, which is included for the purpose of engaging with a complementary gearing of an outer race. In addition, the radial seal lip 6 which is constructed from the elastic part of the protective ring 5 is included in the configuration for the purpose of creating a static seal with the outer surface of the outer race, thereby protecting and sealing the region of the orbital rivet bond and/or of the gearing from the outside, on the periphery of the same. In addition, the seal lip 17 serves the purpose of implementing a static seal on the side of the bearing, achieved by means of abutment with the thrower ring of the cassette seal 4.

The protective ring 5 has, in addition to the elastic part, a reinforcement as well, which is substantially designed with a cylindrical shape, in order to be fastened and centered on the outer peripheral surface 15 of the axial extension 8. In this case, the axial end face 21 serves as a limit stop, without involving the cassette seal 4 in the process, when the protective ring 5 is moved or placed thereon.

The axial extension 8 has a width which approximately corresponds to the width E of the orbital rivet bond, thereby creating an adequate seat for the protective ring 5. As a result, it is not necessary for the axial extension 8 to extend further past the engagement of the end-face gearing 7, thereby saving bearing steel, because the protective ring 5 has the required width for covering the desired region.

The inner peripheral surface 11 and the outer peripheral surface 12 preferably form an annular gap 20 which maintains an opening angle A, which in turn makes it possible to make a visual inspection prior to the placement of the protective ring 5.

The end face of the inner raceway 3 in the region F is advantageously not oriented perpendicular to the axis of rotation, but rather forms an angle F1 together with the plane disposed normal to the axis of rotation, wherein said angle F1 serves to uncouple stresses for the orbital rivet bond by geometrically uncoupling stresses at the transition of the bond from the inner surface 13 to the end face 14.

The inner periphery 11 of the radial extension 8 forms an angle G1 together with the axis of rotation, and this still provides sufficient decoupling of loads in the axial outer region, even with a larger inner diameter when the orbital rivet bond contacts the inner peripheral surface 11.

The second seat of the outer peripheral surface 15 is sunk inward into the outer peripheral surface 16 compared to the seal seat, such that firstly a limit stop is created on the end face 21, and moreover the axial extension 8 requires less material in its design. As a consequence, the protective ring 5 has a smaller diameter, thereby further saving material.

The rolling element raceway 19 of the rolling elements 2, the same designed as balls, is not subjected to any deformation during the formation of the orbital rivet bond or during the formation of the gearing, because the base of the rolling element raceway 19 is situated farther from the axis of rotation than the outer peripheral surface of the orbital rivet bond 12. The same observation applies for a tapered roller bearing arrangement with conical bearing surfaces and load-bearing tapered rollers as the rolling elements.

The inner peripheral surface 11 need not necessarily have a conical shape. It can also have a cylindrical shape, by way of example, which can moreover likewise be included for the attachment of a protective ring 5 or another element. In this case, the named element forms the desired, load decoupling annular gap together with the outer peripheral surface of the orbital rivet bond, leading to the named advantages.

The invention relates to an inner raceway having a rolling element raceway facing outward radially, for an angular contact bearing arrangement, particularly an angular ball bearing arrangement, wherein a cylindrical surface is included at the furthest position outward and serves as the seal seat. Such inner raceways are used, by way of example, in wheel bearing units which have an orbital rivet bond, wherein the same can optionally form an end-face gearing. The orbital rivet bond and the axial extension of the inner raceway form an annular gap which leads to a configuration wherein a decoupling of loads from the inner raceway prevents an undesired deformation of the same. In addition, advantages result for the sealing of the region of the orbital rivet bond and/or the end-face gearing thereof.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMERALS 1 wheel hub
2 rolling element
3 inner raceway
4 seal arrangement
5 protective ring
6 seal lip
7 end-face gearing
8 axial extension
9 outer raceway
10 end face of the extension
11 inner surface
12 outer surface
13 inner surface
14 functional end face
15 second seat
16 seal seat
17 seal lip
18 rim
19 raceway
20 annular gap
21 axial end face
A apex angle of the annular gap
B inner cross-section
C inner cross-section
DW rolling element diameter
E width of the orbital rivet bond
F region
G region
F1 angle
G1 angle

What we claim is:

1. An inner raceway, comprising:
   a rolling element raceway for an angular ball bearing arrangement;
   an axial end face having a first portion and a second portion radially inward of said first portion;
   a cylindrical surface operatively arranged to provide a seal; and,
   an axial extension extending axially between said first and second portions of said axial end face and positioned opposite said rolling element raceway axially, said axial extension comprising:
      an outer periphery arranged radially inwardly of said cylindrical surface; and
      an inner periphery arranged radially inwardly of said outer periphery.

2. The inner raceway recited in claim 1, wherein said outer peripheral surface of said axial extension forms a second seat.

3. The inner raceway recited in claim 1, wherein said inner surface of said axial extension is designed as a conical, parabolic, or similar inner surface.

4. A wheel bearing unit, comprising:
   an orbital rivet bond abutting an axial end face of said wheel bearing unit, said orbital rivet bond having a first width;
   an inner raceway attached and braced via said orbital rivet bond, said inner raceway including:
      an axial extension designed on said axial face and arranged radially outward of said orbital rivet bond said axial extension having a second width which approximately corresponds to said first width; and, an annular gap formed between said orbital rivet bond and said axial extension.

5. The wheel bearing unit recited in claim 4, wherein an outer peripheral surface of said orbital rivet bond forms an apex angle together with an inner peripheral surface of said axial extension.

6. The wheel bearing unit recited in claim 4, wherein an outer peripheral surface of said orbital rivet bond and an inner peripheral surface of said axial extension both form a non-cylindrical surface.

7. The wheel bearing unit recited in claim 4, wherein an outer peripheral surface of said orbital rivet bond and an inner peripheral surface of said axial extension both form a conical, parabolic, or similar surface.

8. An inner raceway, comprising:
 a rolling element raceway for an angular contact bearing arrangement;
 an axial end face having a first portion radially outward of a second portion;
 a cylindrical surface operatively arranged to provide a seal seat; and,
 an axial extension extending axially between said first and second portions and positioned opposite said rolling element raceway axially, said axial extension comprising:
 an outer periphery arranged radially inwardly of said cylindrical surface; and
 an inner periphery arranged radially inwardly of said outer periphery.

9. A wheel bearing unit, comprising:
 an orbital rivet bond abutting an axial end face of a wheel bearing unit;
 an inner raceway attached and braced via said orbital rivet bond and enclosed radially by an axial extension designed on said axial end face, wherein an annular gap is formed between said orbital rivet bond and said axial extension; and,
 an end-face gearing is constructed on said orbital rivet bond for the purpose of transmitting torque.

10. A wheel bearing unit, comprising:
 an orbital rivet bond abutting an axial end face of a wheel bearing unit;
 an inner raceway attached and braced via said orbital rivet bond and enclosed radially by an axial extension designed on said axial end face, wherein an annular gap is formed between said orbital rivet bond and said axial extension; and,
 a protective ring attached on an outer peripheral surface of said axial extension.

\* \* \* \* \*